United States Patent
Herla et al.

(10) Patent No.: US 8,433,429 B2
(45) Date of Patent: Apr. 30, 2013

(54) METHOD FOR CONTROLLING A DEVICE AND MACHINE MODULE ARRANGEMENT AS WELL AS AN ENGINEERING SYSTEM AND RUNTIME SYSTEM FOR IMPLEMENTING THE METHOD

(75) Inventors: Werner Herla, Höchstadt (DE); Klaus Hertinger, Erlangen (DE); Martin Kiesel, Poxdorf (DE); Guido Seeger, Baiersdorf (DE)

(73) Assignee: Siements Aktiengesellschaft, München (DE)

( * ) Notice: Subject to any disclaimer, the term of this patent is extended or adjusted under 35 U.S.C. 154(b) by 768 days.

(21) Appl. No.: 12/087,136

(22) PCT Filed: Nov. 23, 2006

(86) PCT No.: PCT/EP2006/068795
§ 371 (c)(1),
(2), (4) Date: Jun. 26, 2008

(87) PCT Pub. No.: WO2007/077054
PCT Pub. Date: Jul. 12, 2007

(65) Prior Publication Data
US 2009/0007055 A1    Jan. 1, 2009

(30) Foreign Application Priority Data
Dec. 28, 2005  (DE) .......................... 10 2005 062 810

(51) Int. Cl.
*G05B 19/42* (2006.01)
*G05B 15/00* (2006.01)
*G06F 19/00* (2006.01)
*G06F 9/44* (2006.01)
*G06F 17/22* (2006.01)
*G07F 19/00* (2006.01)

(52) U.S. Cl.
USPC ................... 700/86; 700/87; 700/1; 700/181; 717/101; 705/301

(58) Field of Classification Search ................... 700/87, 700/86, 1, 181; 717/101; 705/301
See application file for complete search history.

(56) References Cited

U.S. PATENT DOCUMENTS

| | | | | |
|---|---|---|---|---|
| 5,664,221 A | * | 9/1997 | Amberg et al. | 710/9 |
| 6,108,308 A | * | 8/2000 | Flavin et al. | 370/238 |
| 6,141,726 A | * | 10/2000 | Dell | 711/103 |

(Continued)

FOREIGN PATENT DOCUMENTS

| | | |
|---|---|---|
| DE | 197 37 182 A1 | 3/1999 |
| EP | 1 221 638 A2 | 7/2002 |

(Continued)

*Primary Examiner* — Jeffrey A Gaffin
*Assistant Examiner* — Jason Lin

(57) ABSTRACT

There is described an engineering systems and generating projects. The projects are used by runtime systems for the control of device and machine modular arrangements. The projects are not completely unmodifiable, instead an individualization layer is provided: particular data input possibilities for base data used by the runtime system are provided with an attribute, which gives whether the data entry in the project shall be unmodifiable or whether said entry may be optionally modifiable by the runtime system. A change is correspondingly optionally carried out with the runtime system. The actual core of the project, however does not need to be re-programmed such that a reversion to the engineering system is not necessary.

20 Claims, 1 Drawing Sheet

U.S. PATENT DOCUMENTS

| | | | |
|---|---|---|---|
| 7,275,236 B1 * | 9/2007 | Kabe | 717/106 |
| 2001/0032038 A1 * | 10/2001 | Eiting et al. | 701/1 |
| 2002/0035450 A1 * | 3/2002 | Thackston | 703/1 |
| 2002/0082720 A1 * | 6/2002 | Birzer et al. | 700/18 |
| 2002/0184410 A1 * | 12/2002 | Apel et al. | 710/5 |
| 2003/0236868 A1 * | 12/2003 | Naitou | 709/220 |
| 2005/0137727 A1 * | 6/2005 | Feuerbach et al. | 700/87 |
| 2005/0193009 A1 * | 9/2005 | Reinhardt et al. | 707/104.1 |
| 2006/0026455 A1 * | 2/2006 | Hwang et al. | 714/5 |
| 2008/0155066 A1 * | 6/2008 | Danz et al. | 709/220 |

FOREIGN PATENT DOCUMENTS

| | | |
|---|---|---|
| EP | 1 548 527 A1 | 6/2005 |
| JP | 62103702 A | 5/1987 |
| JP | 10303942 A | 11/1998 |
| JP | 2005135414 A | 5/2005 |
| WO | WO 00/10060 | 2/2000 |
| WO | WO 2005/078540 A1 | 8/2005 |

* cited by examiner

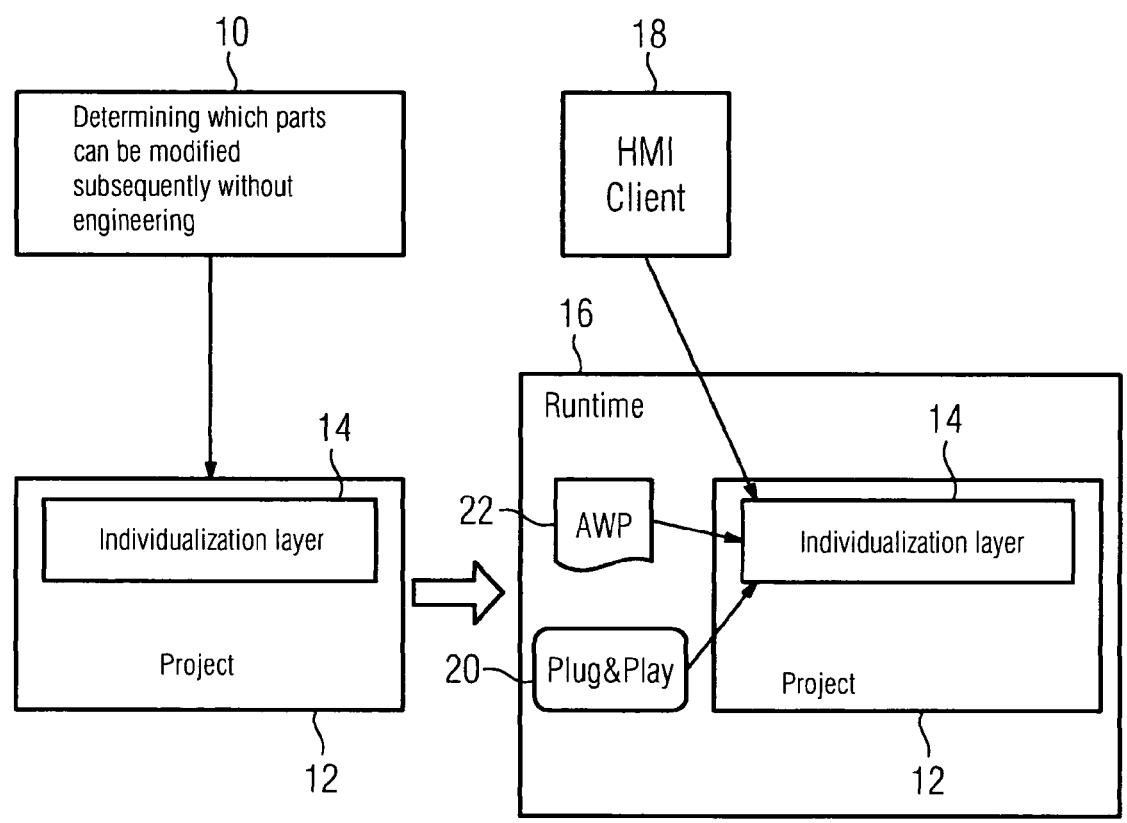

METHOD FOR CONTROLLING A DEVICE AND MACHINE MODULE ARRANGEMENT AS WELL AS AN ENGINEERING SYSTEM AND RUNTIME SYSTEM FOR IMPLEMENTING THE METHOD

CROSS REFERENCE TO RELATED APPLICATIONS

This application is the U.S. National Stage of International Application No. PCT/EP2006/068795, filed Nov. 23, 2006 and claims the benefit thereof. The International Application claims the benefits of German application No. 10 2005 062 810.9 DE filed Dec. 28, 2005, both of the applications are incorporated by reference herein in their entirety.

FIELD OF INVENTION

The invention relates to a method for controlling a device and/or machine module arrangement. It also relates to an engineering system for implementing the method and a runtime system for implementing the method.

BACKGROUND OF INVENTION

To control a device and machine module arrangement a so-called project is generated, which is a combination of so-called machine objects, which represent the devices and machine modules of the arrangement. Such a project can include configuration data, parameterization data and programs.

Such a project is generated by a programmer with the aid of an engineering system. On the target system, in other words in proximity to the device and machine module arrangement, is a runtime system, as a counterpart to the engineering system, on which runtime system the project runs in the manner of a computer program.

It is always important here for the project to be tailored to the respective device and machine module arrangement. The project must be based on knowledge of the device and machine module types used.

Until now all the necessary basic data in the project had to be determined at the time of engineering. This includes for example the addresses of the devices and modules (e.g. the so-called IP address of an Ethernet interface) and the bus clock for timing signals by way of a clock-synchronous fieldbus used in the context of the arrangement. Also in certain instances the topology must be known in detail; even if the components as such are known, in the case of a series arrangement of the devices and modules for example, their sequence must also be known.

Determining this basic data is frequently cumbersome in day to day operation. With a real arrangement there can be slight deviations from the configured arrangement. For example when the production machine is incorporated in the end customer network, the address of a device may look different or it may no longer be possible to use the configured bus clock for certain application reasons.

Until now with repeated deployment of the engineering system the project had to be modified specifically for the respective situation. It was thus always necessary to modify the entire project.

It is disadvantageous that on the one hand the engineering system has to be deployed once again for adaptation to the device and machine module arrangement present locally on the machine, when it does not necessarily have to be present locally itself. Also the creation of a project is associated with significant outlay, so that it is unfortunate if changes have to be made to the project. Also the local operators are often not able to operate the engineering system and to make the changes to the project.

EP 1 548 527 A1 describes a control or regulation facility of a machine tool or production machine. User software is programmed in an engineering system. Application-specific macros are also created in addition to the user software. The user software can be modified by means of the macro. Parameters and their parameter values can also be modified by means of a macro.

EP 1 221 638 A2 also describes the use of macros in an automation system, with which it is possible to initiate a series of automatic configuration and parameterization processes.

SUMMARY OF INVENTION

An object of the invention is to specify a method, with which smaller changes to the basic data can be managed more easily and with less outlay as well as more reliably for the inventory of, the actual project. It is also an object to embody an engineering system and a runtime system correspondingly so that the method can be implemented.

The object is achieved by a method as claimed in an independent claim, an engineering system as claimed in a further independent claim and a claimed runtime system.

According to the invention therefore when the project is being created in the engineering system an attribute is assigned to data input possibilities provided in the project for the basic data, said attribute indicating whether the data input in the project is to be unmodifiable (in other words is to be determined once and then can no longer be modified) or whether it can be individualized and can optionally still be modified in the runtime system (also including the instance where it is determined for the very first time in the runtime system). To adapt the project to the device and machine module arrangement to be controlled, corresponding inputs can then be made for the individualizable data input possibilities in the runtime system. Generally inputs are actually made (or modified) for at least some of the individualizable data input possibilities.

The invention therefore creates a project, in which there is an adjustable individualization layer. A distinction is therefore made between the actual core of the project, which cannot be modified as before, and data inputs, for which individualization is possible. It is therefore possible to carry out small adaptations to the respective specific device and machine module arrangement locally in the context of the runtime system, so that it is not necessary to reprogram or modify the actual project. The adaptation can therefore take place locally by way of operating means which are available at the machine and the engineering system therefore no longer has to be involved. Also the attribute, which relates to individualization, precisely determines the limits of modifiability.

In one preferred embodiment when the project is being created a setpoint basic data set for a standard device and machine module arrangement is assumed, on the basis of which a first input is made for the data input possibilities, it being possible for the individualizable data inputs to be modified in the runtime system, if the device and machine module arrangement deviates from the standard device and machine module arrangement.

The alternative to this is for no first input to be made initially in the engineering system for the individualizable data input possibilities and for the corresponding data inputs only to be made in the runtime system. Generally the first alternative will be preferred, because as many data inputs as possible of the basic data should be determined in the context of the engineering system, so that as little as possible remains to be done in the runtime system.

With both possibilities mentioned at least some of the individualizable data inputs can be modified with user interaction or the data input possibilities can be carried out with user interaction. To this end the runtime system can wait for the initiative of the user wishing to change certain data inputs correspondingly. Particularly when the data input possibilities are only used with user interaction, in other words inputs are made, it is possible for the runtime system to list all the individualizable data input possibilities in the manner of pre-determining a mask, to allow the user to make the input thus.

It is also possible in all instances, in particular it is additionally possible for at least some of the inputs to be made automatically, for example during connection to the device or machine module arrangement. There are known procedures for this, which are generally known as plug and play. In other words a device or machine module is connected and the system automatically identifies its type and further identifiers such as address, plug-in position, etc.

The general concept of data input possibilities can include a plurality of possibilities. At least some of the individualizable data input possibilities can thus include addresses of bus users.

The addresses of bus users in particular are not always identical for otherwise identically structured arrangements. It is possible here to use individualization particularly elegantly to carry out an adaptation to the details of the respective arrangement without having to change the entire project.

At least some of the individualizable data input possibilities can also include symbol names for addressing nodes in a network. In a network it is possible for a name to have been allocated already, so that it must be changed, when a new user is added. The names are then preferably extendable in the presence of the attribute that they can be individualized. In other words two devices with the same name can be distinguished by a corresponding identifier, which is indicated in the extension of the name (e.g. by simple numbering).

At least some of the individualizable data input possibilities can also include the location of a specific device or a specific machine module. For example a project can be designed for a specific grouping of devices and machine modules, whose topology does not however necessarily have to be determined in detail. In the case of series arrangements specifically it may be necessary to change the sequence of the individual devices and machine modules. If the location is then attributed as individualizable, it is possible to include variations in the topology (for an otherwise identical device and machine module inventory).

In a further example the address information is derived from local location information. This is done for example by addressing a plug-in position representing the location, in other words an interface, at which corresponding plug-in connections of the device or machine module are plugged in.

At least some of the individualizable data input possibilities can include a bus clock for a fieldbus. It is thus possible to take into account the above-mentioned instance, where the bus clock is determined in the project but subsequently proves not to be suitable. The bus clock problem too can thus be resolved easily by way of individualization, with only the runtime system being deployed according to the invention and there being no need to reprogram the project in the engineering system.

A engineering system is designed so that the programmer can assign an attribute to at least some of the data input possibilities provided in the project for the basic data, indicating whether the associated data input can be individualized in a runtime system (i.e. can be input there or can be modified if already input) or if it cannot be modified without changing the project.

The runtime system can use projects generated with the aid of the engineering system. The runtime system is hereby designed to make inputs for the data input possibilities characterized as individualizable and to modify an input that may be present.

The runtime system is suitable for the above-mentioned plug and play controller. In other words it is designed to identify connected devices and machine modules and their identifiers, in particular address and plug-in position, automatically and make and/or modify the inputs as required based on the identification.

Instead of automatic identification it is also possible to display the inputs present for the data input possibilities characterized as individualizable to an operator and to request new inputs from said operator. In the event that no inputs are yet present but the inputs have been inserted into these corresponding individualizable data input possibilities, only the new inputs are requested. To this end the runtime system can use suitable masks, on which the data input possibilities are listed.

BRIEF DESCRIPTION OF THE DRAWING

The invention is described below with reference to the FIGURE, which shows in schematic form the method steps of the inventive method with the inventive engineering system and the inventive runtime system.

DETAILED DESCRIPTION OF INVENTION

As is standard in the prior art, a project 12 is generated in an engineering system 10. The project is essentially a project like any other, in other words machine objects are used and are combined to form a specific arrangement, which is intended to reflect a real device and machine module arrangement. For subsequent control purposes it is also necessary to input specific basic data. The engineering system 10 differs from conventional engineering systems in this respect. In this instance it is possible to determine which parts of the basic data will be able to be modified subsequently without engineering. In other words data input possibilities are assigned an attribute, which indicates whether or not the data input is individualizable. Individualizable here means that the corresponding data inputs can be adapted at a later time, namely in the runtime system.

A first input is preferably made in the engineering system for the data input possibilities, corresponding to a setpoint basic data set (default). In the inventive project therefore a so-called individualization layer 14 results, in other words a group of data input possibilities, which can be individualized.

The project 12 is now loaded into a runtime system 16. The runtime system 16 is located locally at the device and machine module arrangement to be controlled and must in some instances be adapted individually to conditions there. Deviations from the setpoint basic data set must therefore be detected. To this end it is necessary to access the individualization layer 14. The core inventory of the project 12 is not modified in this process.

According to a first possibility an HMI client (Human Machine Interface Client) 18 is provided. For example the runtime system 16 can predetermine a mask, in which all the data inputs of the individualization layer 14 are displayed, in other words all the data inputs that are characterized as individualizable. In the context of the mask a user can then confirm the setting according to the setpoint basic data set, in other words the first input, by pressing the input key or can make a change to the corresponding input, for example by way of a keyboard (not shown).

In one variant, which can be predetermined as an addition or alternative, a plug and play modality 20 is provided. The runtime system 16 is connected to a specific device and machine module arrangement and identifies different characteristics of the connected devices and machine modules. These include their type and address; the topology can also be known via the plug and play modality 20. It is correspondingly possible for the individualization layer 14 to be adapted automatically to the conditions identified via the plug and play modality 20 in the runtime system 16, in other words the corresponding data inputs can be modified as required.

The same is also possible with the aid of a user program (AWP) 22. User programs are known within the context of the control of device and machine module arrangements. In the present instance the individualization layer 14 can be accessed so that certain data inputs, whose attribute is that they can be individualized, can be modified.

The three modalities 18, 20 and 22 can be present simultaneously independently of one another or may only be provided as alternatives to one another.

It is a characteristic of the invention that the actual core of the project 12 is not changed. Changes only take place in a previously precisely determined individualization layer 14. The changes are made by the runtime system 16. The engineering system 10 is no longer required at these subsequent times.

In the context of the individualization layer 14 it is possible to detect variations of the device and machine module arrangement relating to its addressing, relating to the topology (location of individual machine modules for example) or even relating to a bus clock for a fieldbus.

The invention claimed is:

1. A computerized method for controlling a device and machine module arrangement, comprising:
    combining machine objects associated with the device and machine modules in an engineering system by an operator to form a project comprising computer program code, wherein the project is deployed for the automatic control of the arrangement by a runtime system executable with a computer, and wherein the project requires certain basic computer-readable data for the control of the arrangement;
    providing an attribute when the project is being created in the engineering system, wherein the attribute comprises a computer-readable attribute and is assigned to computer-readable data input possibilities provided in the project for the basic data indicating whether the data input in the project is to be unmodifiable or whether the data input is individualizable and where necessary can still be modified in the runtime system;
    defining in the project an adjustable individualization layer, which is distinct from a core of the project;
    limiting modifications of individualizable data inputs only to the adjustable individualization layer and the core of the project remaining unmodifiable; and
    providing computer-readable data input possibilities for the individualizable data inputs so that, when the runtime system is executed by the computer, an adapting of the project is performed to control the device and machine module arrangement, wherein the adapting of the project is based on said modifications of the individualizable data inputs, which are limited only to the adjustable individualization layer and without modifying the core of the project and thus without having to reprogram the project.

2. The method as claimed in claim 1, wherein when the project is being created, a setpoint basic data set is assumed for a standard device and machine module arrangement, according to which a first input is made for the data input possibilities, it being possible to modify the individualizable data inputs in the runtime system if the device and machine module arrangement deviates from the standard device and machine module arrangement.

3. The method as claimed in claim 2, wherein at least some of the individualizable data inputs can be modified with user interaction.

4. The method as claimed in claim 2, wherein at least some of the individualizable data inputs are modified automatically.

5. The method as claimed in claim 3, wherein at least some of the individualizable data inputs are modified automatically.

6. The method as claimed in claim 1, wherein no first input is made in the engineering system for the individualizable data input possibilities, and wherein the corresponding inputs are only made in the runtime system.

7. The method as claimed in claim 6, wherein inputs are made with user interaction for the individualizable data input possibilities.

8. The method as claimed in claim 6, wherein at least some of the inputs are made automatically for the individualizable data input possibilities.

9. The method as claimed in claim 7, wherein at least some of the inputs are made automatically for the individualizable data input possibilities.

10. The method as claimed in claim 1, wherein at least some of the individualizable data input possibilities include addresses of bus users.

11. The method as claimed in claim 1, wherein at least some of the individualizable data input possibilities include symbol names for nodes in a network, wherein the names are extendable in the presence of the attribute that they are capable to be individualized.

12. The method as claimed in claim 1, wherein at least some of the individualizable data input possibilities include the location of a specific device or a specific machine module.

13. The method as claimed in claim 12, wherein the location is included by addressing a plug-in position representing the location.

14. The method as claimed in claim 1, wherein at least some of the individualizable data input possibilities include a bus clock for a fieldbus.

15. An engineering system for controlling a device and machine module arrangement, comprising:
    a device to generate a project comprising computer program code for controlling the device and machine module arrangement by combining machine objects by a programmer, wherein as part of the project the programmer additionally inputs computer-readable basic data for the project as required for the control operation; and
    an attribute assigner so that the programmer can assign a respective computer-readable attribute to at least some data input possibilities provided in the project, the respective attribute indicating whether or not an associated data input can be individualized in a runtime system executable by a computer;

an adjustable individualization layer defined in the project, the adjustable individualization layer being distinct from a core of the project, wherein modifications of individualizable data inputs are limited only to the adjustable individualization layer, and wherein the core of the project remains unmodifiable, wherein the runtime system is executed by the computer so that the project is adapted to control the device and machine module arrangement, wherein adaptation of the project is based on said modifications of the individualizable data inputs, which are limited only to the adjustable individualization layer and without modifications to the core of the project and thus without having to reprogram the project.

16. The engineering system as claimed in claim 15, wherein the associated data is inputted in the runtime system or modified in the runtime system.

17. A runtime system executable with a computer for implementing a computerized method to control a device and machine module arrangement, comprising:

a project comprising computer program code, wherein machine objects associated with device and machine modules are combined in an engineering system by an operator to form the project, wherein the project is deployed for the automatic control of the arrangement by a runtime system, wherein the project requires certain basic computer-readable data for the control of the arrangement, wherein an attribute is provided when the project is created in the engineering system, wherein the attribute comprises a computer-readable attribute and is assigned to computer-readable data input possibilities provided in the project for the basic data indicating whether the data input in the project is to be unmodifiable or whether the data input is individualizable and where necessary can still be modified in the runtime system;

an adjustable individualization layer defined in the project, the adjustable individualization layer being distinct from a core of the project wherein modifications of individualizable data inputs are limited only to the adjustable individualization layer and the core of the project remains unmodifiable; and computer-readable inputs for the data input possibilities characterized as individualizable, wherein the runtime system is executed by the computer so that the project is adapted to control the device and machine module arrangement, wherein adaptation of the project is based on said modifications of the individualizable data inputs, which are limited only to the adjustable individualization layer and without modifications to the core of the project and thus without having to reprogram the project.

18. The runtime system as claimed in claim 17, wherein the runtime system identifies connected devices and machine modules and their identifiers automatically, and wherein the inputs as required based on the identification are modified.

19. The runtime system as claimed in claim 18, wherein an address and a plug-in position of connected devices and machine modules are identified.

20. The runtime system as claimed in claim 17, wherein inputs present for the data input possibilities characterized as individualizable are displayed, and wherein new inputs are requested from an operator.

* * * * *